United States Patent [19]

Cripe

[11] 3,731,410
[45] May 8, 1973

[54] MOTOR GRADER WITH DEVICE FOR GUIDING VEHICLE ALONG A PAIR OF PARALLEL RAILS

[75] Inventor: Gordon L. Cripe, Boise, Idaho

[73] Assignee: Morrison Knudsen Company, Inc., Boise, Idaho

[22] Filed: Apr. 21, 1971

[21] Appl. No.: 136,156

[52] U.S. Cl. ................................37/104, 105/215 C
[51] Int. Cl. ..............................E02f 5/22, B61f 1/00
[58] Field of Search.................. 37/104–107; 171/16; 104/2; 105/215 R, 215 C

[56] References Cited

UNITED STATES PATENTS

| 2,896,553 | 7/1959 | Whisler | 105/215 C |
|---|---|---|---|
| 2,110,230 | 3/1938 | Main | 105/215 C |
| 3,494,299 | 2/1970 | Boyer | 37/104 X |
| 3,019,536 | 2/1962 | Kershaw | 37/104 |
| 3,386,344 | 6/1968 | Junck et al. | 37/8 |
| 3,338,184 | 8/1967 | Fisher | 105/215 C |
| 233,989 | 11/1880 | Cowles | 105/215 C |
| 3,198,137 | 8/1965 | White, Jr. | 105/215 C X |
| 2,348,841 | 5/1944 | Oswald | 105/215 C |
| 2,167,763 | 8/1939 | Luce | 105/215 C |
| 2,911,734 | 11/1959 | Sublett et al. | 37/104 |

FOREIGN PATENTS OR APPLICATIONS

| 373,179 | 1932 | Great Britain | 105/215 C |
|---|---|---|---|
| 146,009 | 1954 | Sweden | 105/215 C |
| 631,799 | 1962 | Italy | 105/215 R |
| 1,210,035 | 1960 | France | 105/215 C |

Primary Examiner—Robert E. Pulfrey
Assistant Examiner—Eugene H. Eickholt
Attorney—Bacon & Thomas

[57] ABSTRACT

An equalizer bar carrying a guide roller at either end thereof, is pivotally connected at its midportion on a ballast support member which is mounted on one end of a road vehicle. The ballast support member and the equalizer bar are movable vertically between a lowered operative position with the guide rollers in engagement with parallel rails and a raised inoperative position by power means such as a hydraulic cylinder controlled by the operator of the vehicle. A similar device is mounted at the other end of the vehicle for guiding it as it moves in either a forward or rearward direction.

25 Claims, 14 Drawing Figures

Fig. 14.

MOTOR GRADER WITH DEVICE FOR GUIDING VEHICLE ALONG A PAIR OF PARALLEL RAILS

The present invention relates to a motor grader rail guide adapted to engage a pair of parallel rails and to guide the vehicle along the rails without rubbing or scuffing the side walls of the tires and wheels of the vehicle against the side of the rails.

In the past, power driven steerable motor vehicles having a blade mounted thereon for grading along railroad tracks were driven along the tracks with all of the wheels positioned outside of the tracks on the ends of the ties and without suitable means for guiding the vehicle along the tracks and preventing the side walls of the tires from being forced against the outside of the tracks causing severe tire sidewall damage and premature failure. In addition, the heavy pressure of the tires bearing against the rail joint signal block ground straps caused severe damage to the straps and frequently tore them loose from the rails.

The present invention obviates the disadvantages mentioned above and is adapted to guide a vehicle along a pair of raised parallel rails in either direction without rubbing or scuffing the sidewalls of the vehicle tires against the side of the rails.

It is an object of the invention to provide guide means at either end of a vehicle which may be selectively lowered into engagement with a pair of parallel rails for guiding the vehicle therealong or raised to an inoperative position out of engagement with the rails.

It is also an object of the invention to provide a rail guide device for a vehicle which follows the rails while permitting a degree of lateral tilting of the vehicle with respect to the rails.

A further object of the invention is to provide a device adapted to be mounted on a land vehicle for guiding it along a pair of parallel rails.

An additional object provides a vehicle guiding device having relatively few parts and which is of strong rugged construction.

These and other objects and advantages of the invention will become more apparent from the following detailed description of a preferred embodiment of the invention when taken in conjunction with the drawings, in which:

The land vehicle frequently employed for grading along railroad tracks and the like is a CATERPILLAR MOTOR GRADER No. 12E or 12F. A motor grader of this general type is shown in phantom lines in FIG. 1 for the purpose of illustrating the invention and includes a chassis 1 supported by a plurality of ground engaging wheels 3.

Figures 1, 13:
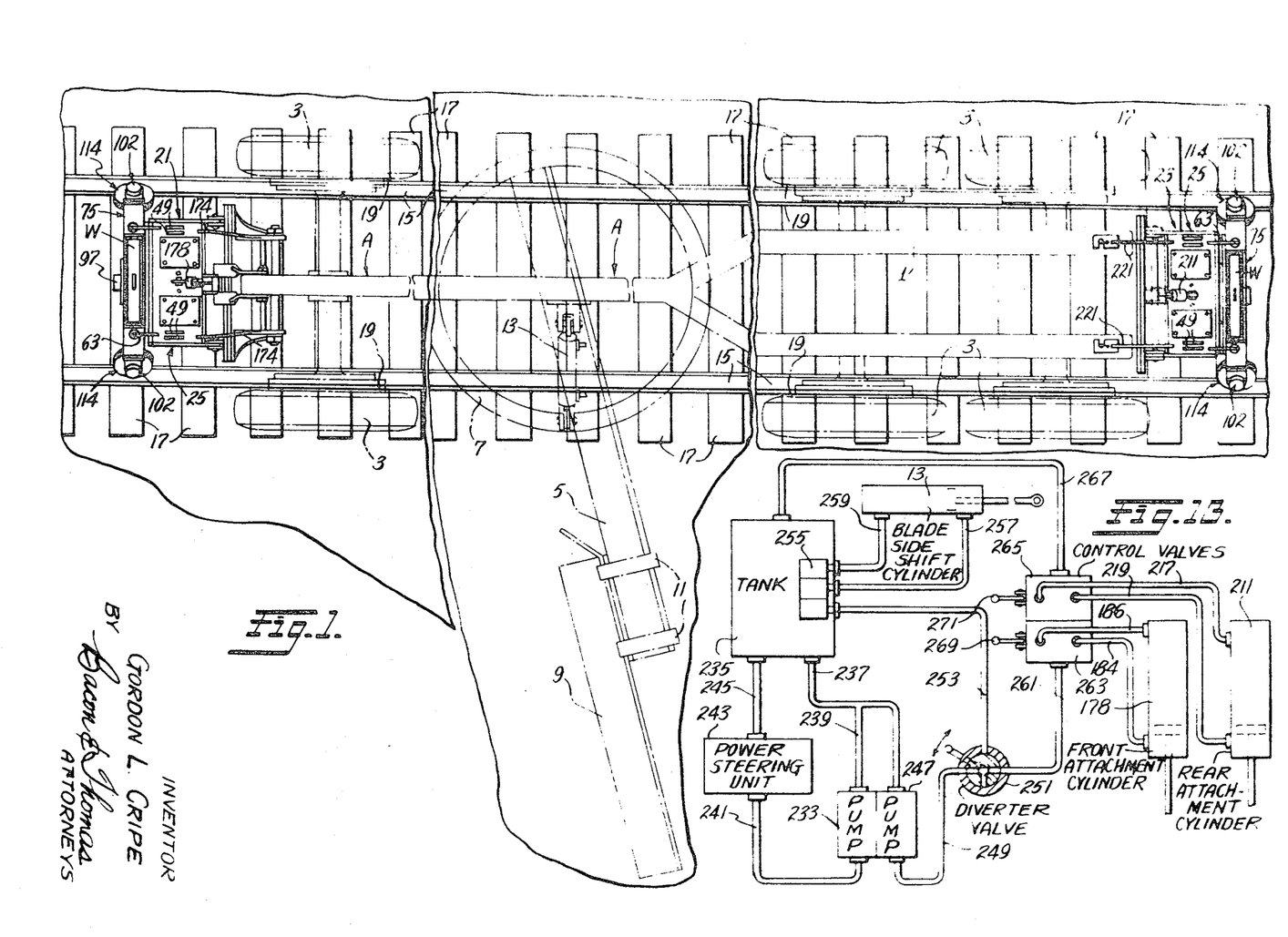
FIG. 1 is a fragmentary plan view showing a motor grader in phantom lines with the front and rear rail guides shown in solid lines for purposes of clarity.
FIG. 13 is a schematic hydraulic circuit diagram for the hydraulic system to the motor grader.

The motor grader A carries a grading blade 5 supported on a turntable 7 for angular adjustment relative to the chassis 1. A blade extension 9 employed for grading along railroad tracks, is rigidly attached to the blade 5 adjacent its outer end by the clamps 11. The blade 5 and the blade extension 9 are moved between an operative position with the blade extension 9 in engagement with the ground and an inoperative position with the blade extension 9 raised out of engagement with the ground by a hydraulic cylinder or fluid motor 13 connected at one end to the vehicle chassis 1 and at the other end to the blade 5.

The wheels 3 of the motor grader A are shown straddling a pair of parallel railroad tracks 15 and resting on the outer ends of the ties 17. The inner surface of each of the pneumatic tires 19 carried by the wheels 3 is spaced only a relatively short distance from the outer surface of the adjacent rail. The rail guides 21 and 23 of the present invention carried by the front and rear end respectively of the motor grader A guide the vehicle along the tracks 15 as the vehicle moves either forwardly or rearwardly to maintain the inner wall of each of the tires 19 parallel with and out of frictional engagement with the opposed outer surface of the adjacent track 15.

The front and rear rail guides 21 and 23 are adapted to be moved between a lowered operative position for guiding the motor grader along the parallel rails or tracks 15 and a raised inoperative position out of engagement with the rails. Since the portions of the front and rear rail guides which are raised and lowered are of the same construction, only one of them will be described in detail.

Each rail guide includes a ballast support member 25 of box like configuration for holding or supporting the required ballast or weight.

As shown, the ballast support member 25 is formed of heavy iron plates and includes a bottom plate 27, side plates 29, a front plate 31, rear plate 33 and a top plate 35 all welded together to form a rigid structure. The side plates 29 extend rearwardly, as at 29a, beyond the rear plate 33 for a short distance and are provided with openings 37 for pivotally mounting the rail guide on the vehicle.

The box-like ballast support member 25 is of generally rectangular configuration and the top plate 35 is formed with a pair of openings 39 for inserting ballast or weights into the interior of the member 25. A pair of covers 41 removably secured to the top plate 35 by the threaded fasteners 43 close the openings 39.

A vertically extending bracket 45 welded or otherwise rigidly secured to the top plate 35 midway between the side plates 29, is provided with an opening 47 for connection with power means for raising and lowering the rail guide as will be explained in greater detail hereinafter.

Also mounted on the upper surface of the top plate 35 adjacent each of the side plates 29, are a pair of parallel locking brackets 49 having aligned openings 51 formed adjacent the upper ends thereof for locking the rail guide in the raised, inoperative position.

A pipe 53 mounted in aligned openings 55 and 57 formed in the front and rear plates 31 and 33 respectively is welded to the plates and provides a bearing opening which extends longitudinally of the ballast support member midway between the side plates 29.

The bottom plate 27 and the top plate 35 are reinforced and secured together adjacent either side of the pipe 53 by the tubular bracing members 59 welded at their ends in openings 60 formed in the top and bottom plates.

A flat bearing plate 61 is fixed, as by welding, to the outer surface of the front plate 31 at either end of the front plate for a purpose which will presently become clear.

Also welded or otherwise fixedly secured to the top plate 35 adjacent either side thereof is a heavy, strong metal post 63 which extends upwardly from the ballast support member 25 and at its upper end is bent and extends forwarding beyond the front plate 31. A stabilizer spring assembly 65 is suspended from the underside of the forwardly projecting portion of each of the metal posts 63. Each of the spring assemblies 65 includes a coil compression spring 67 with its inner end seated in a metal cup 69 and its outer end seated in a metal cup 71. Each of the spring assemblies 65 is secured to its respective metal posts 63 by a threaded bolt 73 which passes through an opening formed in the upper forwardly extending portion of the metal post 63. Preferably, each of the spring assemblies 65 is adjustably mounted relative to its corresponding metal post in such a manner that by rotating the threaded bolt 73, the spring assembly of the coil spring 67 and metal cups 69 and 71 will be vertically adjustable relative to the metal post.

An equalizer bar generally designated by the reference numeral 75 extends horizontally across the rail guide and is disposed contiguous to the bearing plates 61 carried by the front plate 31 of the ballast support member 25.

Each equalizer bar 75 is formed of heavy metal plates including a bottom plate 77, a top plate 79, a front plate 81, a rear plate 83 and end plates 85 all welded together to form an elongated bar of generally rectangular configuration.

A heavy metal bearing collar 87 is mounted in aligned openings 89 formed in the front and rear plates 81 and 83 respectively and midway between the end plates 85.

A mounting plate 91 is located on the underside of each equalizer bar 75 at either end thereof and is welded to the bottom plate 71, the front and rear plates 81 and 83 and the end plates 85. The surface of these mounting plates 91 face downwardly and outwardly and are disposed at an angle of substantially 45° to the top and bottom plates 77 and 79 and at an angle of substantially 90° to each other. The mounting plates 91 are each braced by a gusset plate 93 welded to the underside of the mounting plate and to the bottom plate 77.

A heavy bearing pin 95 extends through the pipe 53 of the ballast support member and through the bearing collar 87 of the equalizer bar and is secured therein by a stop collar 97 secured to either end of the bearing pin 95 by means of a pin or bolt extending through each of the collars and the respective end of the bearing pin.

The equalizer bar 75 is adapted to pivot on the bearing pin 95 with the rear plate 83 of the equalizer bar 75 in sliding frictional engagement with the bearing plates 61 carried by the ballast support member 25.

The extent to which the equalizeHj0Px0r bar may pivot with respect to the ballast support member is limited by the spring assemblies 65 carried by the ballast support member. The metal cup 71 carried by the lower end of each of the coiled springs 67, engages the upper surface of the top plate 79. Thus the coil spring 67 are compressed as the equalizer bar pivots relative to the ballast support member and the extent to which the equalizer bar may pivot is limited by the spring assemblies 65. As mentioned above, the spring assemblies 65 may be adjusted vertically with respect to their individual metal posts in order to provide more or less spring resistance to pivotal movement of the equalizer bar. A grease fitting 99 threaded into a grease passage 100 formed in the bearing pin 95 provides means for lubricating the bearing formed between the pin 95 and the bearing collar 87.

A guide roller unit 102 is mounted on each of the mounting plates 91 and each of said units includes a base plate 104 secured to a mounting plate 91 by a plurality of threaded bolts 106. A pair of parallel, spaced apart bearing support members 108 are welded to the outer surface of the base plate 104 and a cylindrical bearing housing 110 is fixed, as by welding, in an opening 112 formed in each of the bearing support members 108 adjacent the outer end thereof.

A guide roller 114 positioned between the bearing support members 108, is mounted on a roller shaft 116 which is rotatably supported at either end thereof in an antifriction roller bearing 118 carried by the bearing housings 110. A nut 120 threadedly mounted on either end of the roller shaft 116 is employed for adjusting the respective roller bearing 118 and for maintaining the shaft 116 in position. The outer end of each of the cylindrical bearing housings 110 is closed by a cover 122 secured in place by the threaded fasteners 124 in order to protect the roller bearings 118 from abrasive foreign matter.

Figure 12:
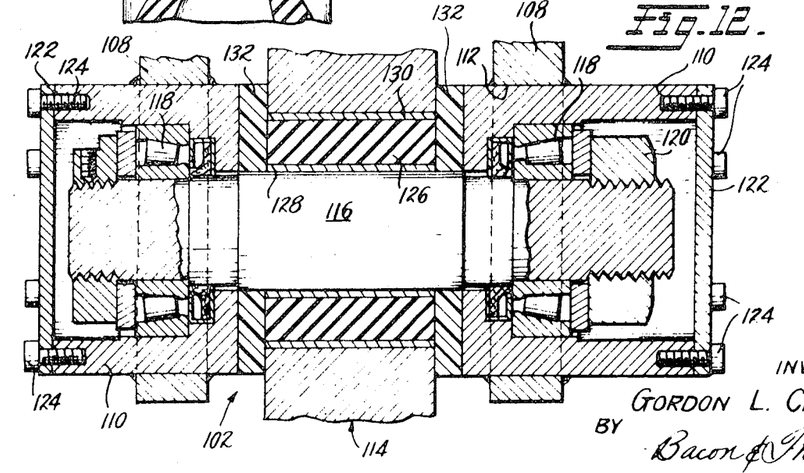
FIG. 12 is an enlarged fragmentary vertical sectional view through one of the guide wheels of the front and rear attachment taken on the line 12—12 of FIG. 2.
Figure 14:
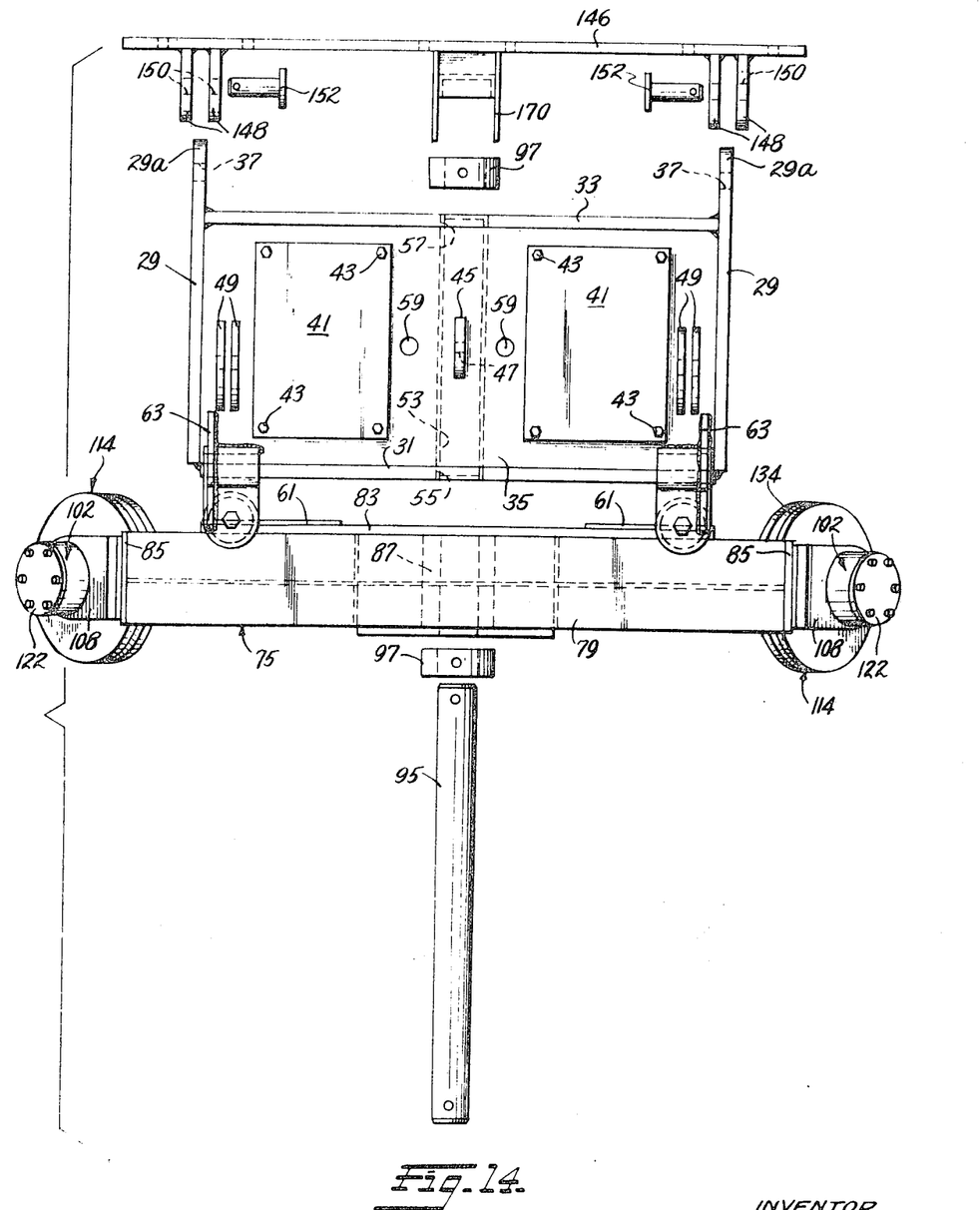
FIG. 14 is an exploded plan view of a rail guide according to the invention.

Each of the guide rollers 114 is preferably electrically insulated from the equalizer bar so that an electric current cannot be conducted from one rail to the other. As best shown in FIG. 12, the guide roller 114 is insulated from the roller shaft 116 by a molybdenum impregnated nylon bushing 126 provided with a thin inner metal sleeve 128 and a thin metal outer sleeve 130.

Preferably, the bushing 126 is pressed into the roller 114 and the metal sleeve 128 is a close, non-rotating fit on the roller shaft 116.

An insulating washer 132 formed of molybdenum impregnated nylon, micarda or other suitable material is mounted on shaft 116 at either side of the guide roller 114 and is positioned between the ends of the rubber bushing 126 and the adjacent wall of the bearing housing 110. By this arrangement, the guide rollers 114 are electrically insulated from the roller shaft 116 and from the bearing housings which carry the shafts.

As each of the guide rollers 114 is adapted to engage a rail at an angle of substantially 45° to the horizontal, the periphery of each of the rollers is formed with a V-shaped groove 134 in the periphery thereof with an included angle of substantially 90°. The walls of each of the grooves are disposed at an angle of substantially 45° with respect to the axis of rotation of the corresponding roller and each roller is adapted to engage its respective rail on the inner surface thereof and on the adjacent top surface. The V-shaped grooves in the rollers are formed so that the wall 136 of the groove which engages the top surface 138 of the rails is of greater width than the wall 140 which engages with the inner side surface 142 of the rails. The top surface 138 of a rail presents a much wider area for contact than does the inner side surface of the rail and an improved guiding device with greater stability is provided by engaging a greater surface on the top wall of the rail than is possible on the side rail thereof.

The front rail guide 21 is attached to the vehicle by mounting and supporting means generally designated by the reference numeral 144 which includes a horizontal mounting bar 146 provided adjacent either end thereof with a pair of forwardly extending, parallel support members 148 formed with aligned openings 150. The mounting pins 152, passing through the openings 150 in the support members 148 and through the openings 37 in the rearwardly extending portions 29a of the side plates 29, mount the front rail guide for pivotal movement.

A pair of spaced apart, heavy mounting arms 154 bolted to the mounting bar 146 by the fasteners 156 extend rearwardly and upwardly from the mounting bar 146 and are connected at their upper ends to an elongated attaching pin 158 journaled in a transverse opening in the front end of the chassis. The opposite ends of the pin 158 extend through openings 160 formed in the arms 154 and the arms are maintained in position on the attaching pin 158 by nuts threaded onto the ends of the attaching pin.

A second pair of mounting arms 162 rigid with the mounting bar 146 extend rearwardly from the mounting bar and are bolted at 164 and 166 to the front axle support casting of the vehicle at either side thereof at a position below the attaching pin 158 thereby providing a rigid connection between the mounting and supporting means 144 and the motor grader A.

A vertical support member 168 is welded or otherwise rigidly secured to the mounting bar 146 midway between the opposite ends thereof and is provided at its upper end thereof with a forwardly extending attaching bracket 170 having an opening 172 formed therein.

A fastening arm 174 is rigidly fixed at one end thereof to each of the mounting arms 154 and extends forwardly and is inclined somewhat upwardly from the respective mounting arm 154. Each of these fastening arms 174 is provided adjacent its outer free end with an opening 176.

Figure 2:
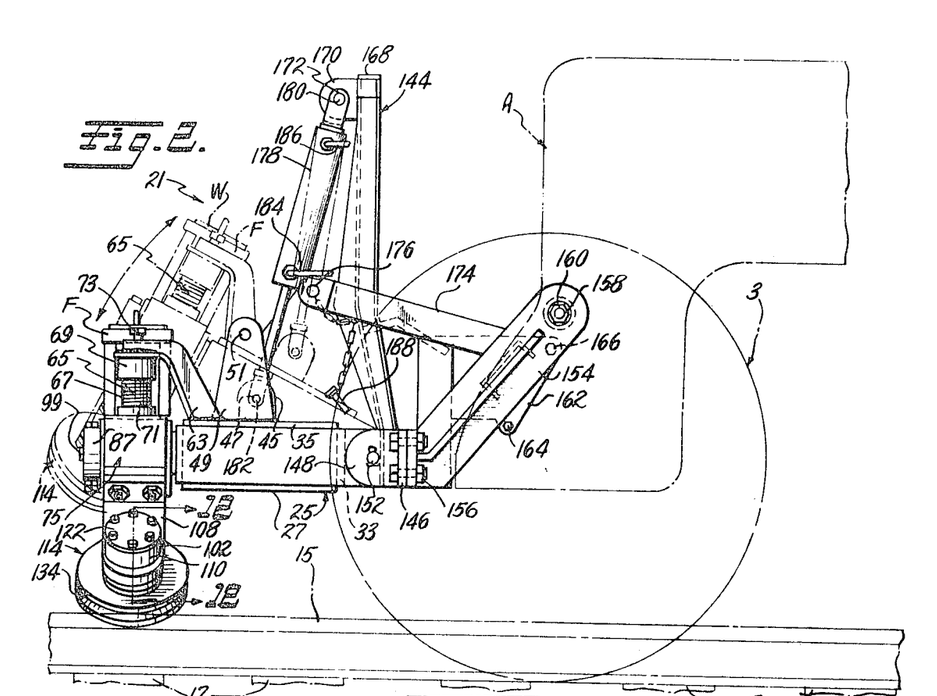
FIG. 2 is an enlarged fragmentary side elevational view of the front guide attachment of the grader of FIG. 1.
Figure 3:
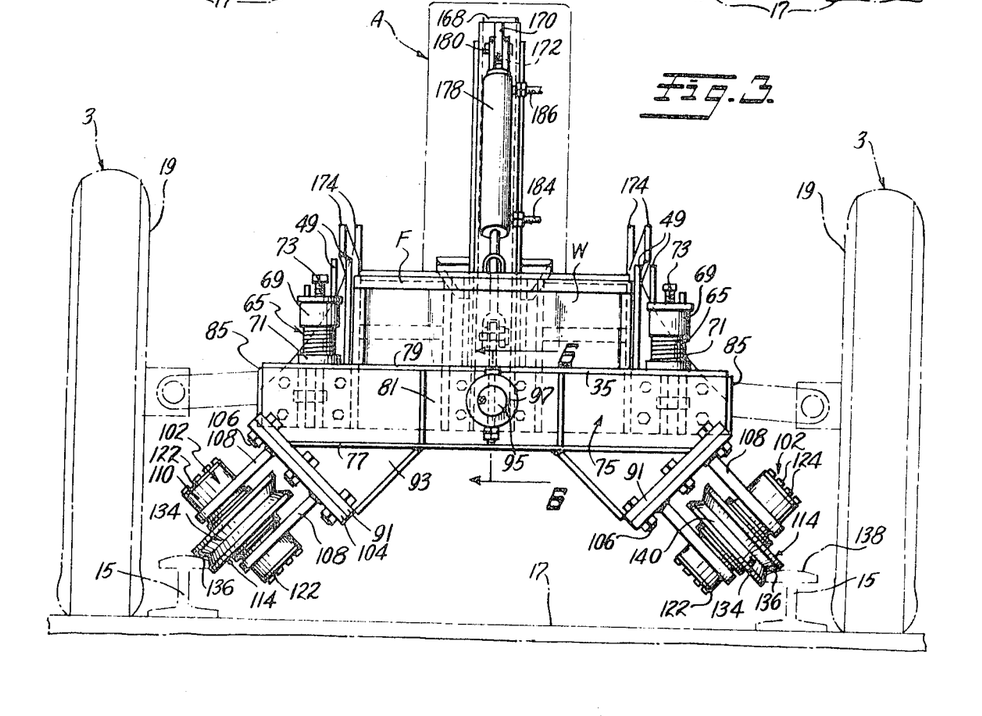
FIG. 3 is an end elevational view of the attachment of FIG. 2 as viewed from the left thereof.

Power means in the form of a hydraulic cylinder or fluid motor 178 is employed for raising and lowering the rail guide. Preferably, the fluid motor 178 is of the double acting type and one end is connected by the pivot pin 180 to the fixed attaching bracket 170 and the other end is connected to the ballast support member by a pivot pin 182 which extends through the opening 47 formed in the bracket 45 rigid with the ballast support member 25. Fluid under pressure supplied selectively to the lines 184 and 186 of the fluid motor 178 will result in raising or lowering the rail guide 21 between the positions shown in full lines and in phantom lines in FIG. 2. When the rail guide 21 is in the raised, inoperative position shown in phantom lines, it may be fastened in this position by the pins 188 inserted through the openings 51 formed in the upper end of the locking brackets 49 and the openings 176 formed in the outer end of the fastening arms 174.

The rail guide 23 is attached to the rear of the vehicle by a mounting end supporting assembly 190 which includes an elongated horizontally extending mounting bar 192 fixed by the bolts 194 to the outer face of the rear bumper and draw bar bracket 196 which is rigid with the grader chassis.

A pair of parallel support brackets 198 having aligned pivot pin openings 201 formed therein, extend outwardly from the surface of the mounting bar 192. The pivot pins 203 which extend through the openings 201 in the support bracket 198 and through the openings 37 formed in the rearwardly extending portions 29a of the side plates 29, mount the rear rail guide 23 on the mounting end supporting assembly 190.

A support member 205 extends upwardly from the mounting bar 192 midway between the opposite ends thereof and carries at its upper end an outwardly extending bracket 207 formed with a suitable pivot opening 209.

Figure 4:
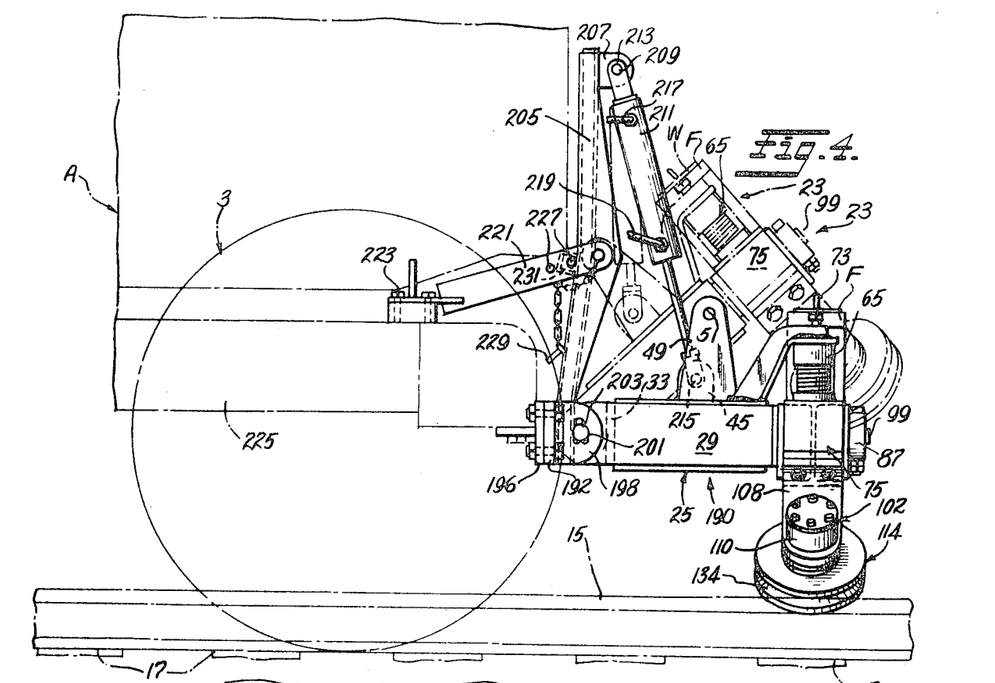
FIG. 4 is an enlarged fragmentary side elevational view of the rear guide attachment of the motor grader of FIG. 1.
Figure 5:
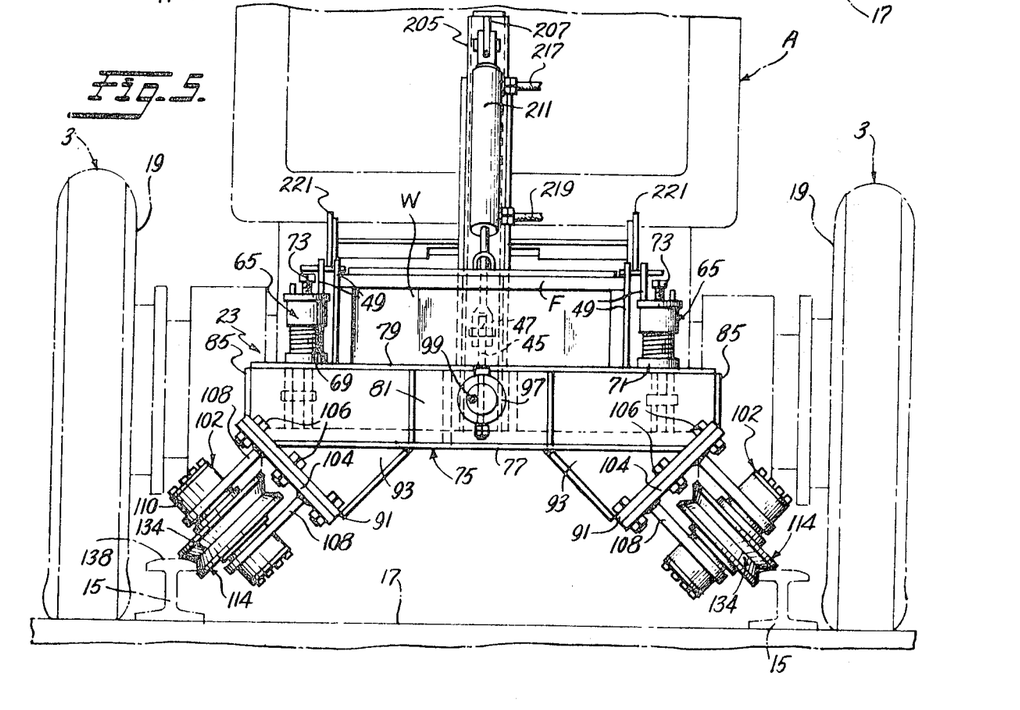
FIG. 5 is an end elevational view of the rear guide attachment of FIG. 4 as viewed from the right thereof.
Figure 6:
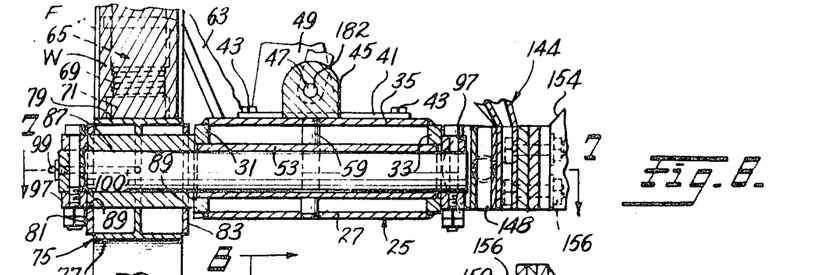
FIG. 6 is an enlarged fragmentary vertical sectional view taken on the line 6—6 of FIG. 3.
Figures 7, 8, 9:
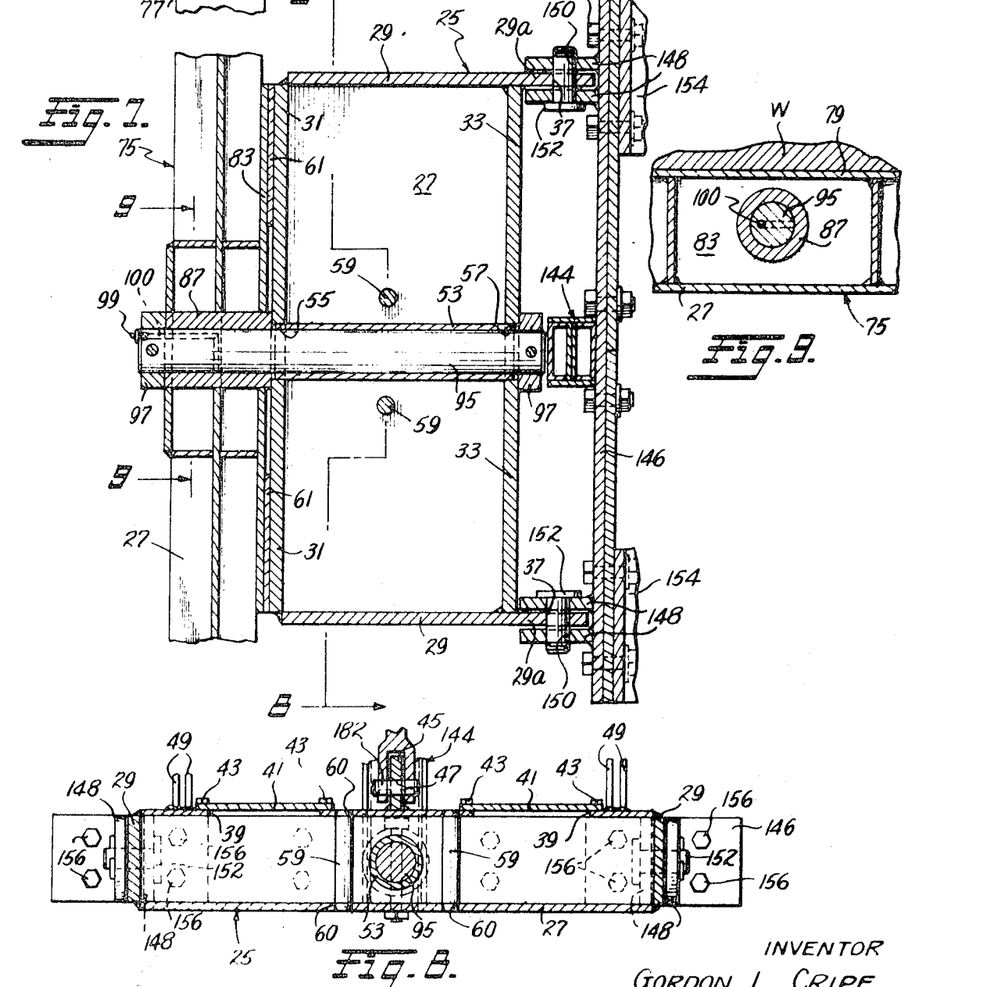
FIG. 7 is a fragmentary horizontal sectional view taken on the line 7—7 of FIG. 6.
FIG. 8 is a fragmentary vertical sectional view taken on the line 8—8 of FIG. 7.
FIG. 9 is a fragmentary vertical sectional view taken on the line 9—9 of FIG. 7.

A fluid motor 211 is connected at its upper end by the pivot pin 213 to the bracket 207 and at its lower end by the pivot pin 215 to the bracket 45 rigid with the ballast support member 25. Fluid under pressure supplied selectively to the lines 217 and 219 of the fluid motor 211 will result in raising or lowering the guide rail 23 between the position shown in full and in phantom lines in FIG. 4.

A locking bracket 221 is bolted as at 223 at one end thereof to a side frame 225 at each side of the grader chassis at the rearward end thereof is inclined upwardly and extends outwardly rearwardly of the vehicle. The outer end of each of the locking brackets 221 is formed with one or more openings 227 and the rail guide 23 may be fastened in the inoperative position shown in phantom lines in FIG. 4 by the fastening pins 229 inserted through the openings 227 in the locking brackets 49 carried by the ballast support member 25.

The vertically extending support member 205 is reinforced and strengthened intermediate its ends by a transversely extending strut 231 which extends between and is rigidly connected at its end to the locking bracket 221 and is rigidly fastened intermediate its end to the support member 205.

The motor grader A is provided with a conventional hydraulic system for steering the front wheels of the vehicle and for extending and retracting the grading blade 5. As illustrated schematically in FIG. 13, a pump 233 driven by the motor of the grader and connected with the hydraulic fluid supply tank 235 by the supply lines 237 and 239, furnishes hydraulic fluid under pressure through the line 241 to the conventional power steering unit 243 from which it is returned to the supply tank 235 through the discharge line 245. The hydraulic pump 233 and the power steering system is always operational when ever the motor of the grader vehicle is operated.

A second hydraulic pump 247 connected with the hydraulic supply lines 237 and 249 is adapted to be connected with the motor of the grader vehicle by suitable conventional means, not shown, which will permit the drive from the motor of the grader vehicle to be selectively connected with the pump 247 whenever desirable.

When the grader blade 5 and the blade extension 9 are to be extended or retracted, the pump 247 is operatively connected with the motor of the grader and fluid under pressure is directed to the fluid motor 13 through the fluid line 249, the selector or diverter valve 251, the fluid line 253, the control valve 255 mounted on the hydraulic fluid supply tank 235 and the lines 257 and 259 connecting the control valve 255 with the fluid motor 13. The control valve 255 directs the fluid under pressure through one of the lines 257 or 259 while venting the other line to the hydraulic fluid supply tank 235.

When it is desired to raise or lower the rail guides 21 and 23, the diverter valve 251 is positioned to direct fluid under pressure from the pump 247 and fluid line 249 through the fluid line 261, the fluid control valve 263 connected with the front rail guide cylinder 178 through the fluid lines 184 and 186, and the fluid control valve 265 connected with the rear rail guide cylinder 211 by the fluid lines 217 and 219, the hydraulic fluid being discharged from the valves 263 and 265 to the hydraulic fluid supply tank 235 through the return line 267.

The selector or diverter valve 251 and the fluid control valves 255, 263, and 265 are all mounted in the operator's cab of the motor grader within easy reach of the position normally occupied by the operator of the vehicle. Preferably, the selector or diverter valve 251 is a two-way valve which may be manually operated to direct fluid under pressure from the fluid line 249 to either the fluid line 253 for extending or retracting the blade 5 and the blade extension 9 or to the line 261 to raise or lower the front and rear rail guide. A suitable valve is manufactured by Gresen Manufacturing Company, 405 35th Avenue, N. E., Minneapolis 18, Minn. and is identified as hydraulic selector valve S series. However, it would be within the purview of this invention, to provide a diverter valve 251 which could be operated to direct fluid under pressure selectively from the fluid pressure line 249 to either the fluid pressure lines 253 or 261 or to simultaneously furnish fluid under pressure to both of the lines 253 and 261.

The fluid control valves 263 and 265 are provided with manual control levers 269 and 271 respectively for controlling the flow of hydraulic fluid to and from the fluid motors 178 and 211. Preferably, the fluid control valves 263 and 265 are of the type manufactured by Gresen Manufacturing Company, 405 35th Avenue, N. E., Minneapolis, Minn. 55418 and identified as model SPK directional control valve with float position. The SPK one spool control valves have four handle positions, that is a raised position, a lowered position, a neutral position which is a hold position, and a float position employed during grading operations, wherein the full weight of the rail guide rests on the parallel rails. The model SPK valves include a built-in relief valve which may be preset at between 1,000 and 1,500 pounds per square inch.

The four position control valves 263 and 265 are each provided with an internal bypass which permits the valves to be secured to each other in the manner illustrated in FIG. 13 and for the discharge from the valves to be returned to the supply tank 235 through fluid line 267.

Figures 10, 11:
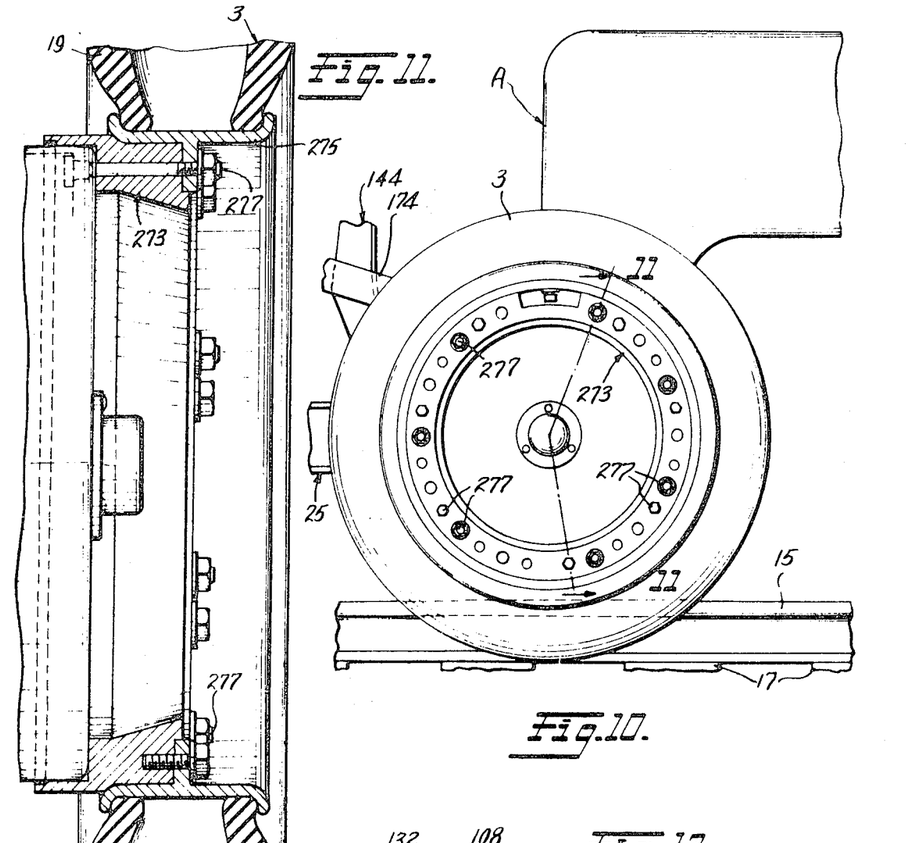
FIG. 10 is an enlarged fragmentary side elevational view similar to FIG. 2 illustrating one of the wheel spacer attachments for increasing the width of the track of the motor grader.
FIG. 11 is an enlarged fragmentary vertical sectional view taken on the line 11—11 of FIG. 10.

It is usually necessary to increase the width of the wheel base of the motor grader so that the inner surface of the tires will be spaced a short distance from the opposed outer surface of the parallel rails. For this purpose, an annular spacer 273, FIGS. 10 and 11, is fastened to each wheel 3 of the motor grader A and to the rim 275 on which the corresponding tire 19 is mounted by a plurality of bolts 277. Each of the spacers 273 has a width of approximately three inches and thus the total width of the wheel base of the vehicle is increased by substantially six inches.

Each of the ballast support members 25 carries sufficient ballast to hold the rail guide firmly on the tracks during operation of the grader and to resist lateral thrust imposed on the vehicle by the action of the grader blade extension 9 during grading operation. A total ballast of approximately 1400 pounds placed in each of the ballast support members 25 and fastened to the upper surface thereof has been found to be sufficient for maintaining the rail guides 21 and 23 firmly in engagement with the parallel rails and for maintaining the inner surface of the vehicle tires out of engagement with the outermost surface of the adjacent rail as the vehicle moves in either direction during grading operations. As the rail guides 21 and 23 are quite heavy, the fluid motors 178 and 211 attached thereto are employed primarily for raising the rail guides from their operative position in engagement with the rails to a raised non-operative position out of engagement with the rails.

Additional weight W may be placed on the equalizer bar 75 within the angle iron frame F fixed on the top plate 79.

In operation, the motor grader is driven to a position with its wheels straddling the rails along which a grading operation is to be performed. The fluid pump 247 is then operably connected with the power plant of the grader and the diverter valve 251 is moved to connect the line 249 to the line 261. The control levers 269 and 271 of the control valves 263 and 265 are then moved to direct fluid under pressure to the lines 186 and 217 to lower the rail guides 21 and 23 into operative position with the guide rollers in engagement with the rails. After moving the control levers to the "float position", the diverter valve is moved to direct fluid to the line 253, after which the grader blades 5 and 9 may be extended into grading position by means of the control valve 255. The motor grader may then be driven in either direction to grade along the rails and the rail guides 21 and 23 will guide the vehicle along the rails and will maintain the tires out of engagement with the sides of the rails. After completing the grading operation, the grader blades may be retracted by moving the control valve 255 to connect the line 257 with the pressure fluid in line 253 and the line 259 connected to vent. The diverter valve may then be moved to again connect line 249 with the control valves 263 and 265 and the rail guides 21 and 23 raised by moving these control valves to the "lift" position connecting the lines 184 and 219 with the pressure fluid. The pins 188 and 229 may then be inserted in the manner described above for holding the rail guides 21 and 23 in the raised position.

While a preferred form of the invention has been described and disclosed herein, such changes and modifications as may occur to those skilled in the art are to be considered within the purview of this invention as fall in the scope of the appended claims.

What I claim is:

1. A land vehicle guidable by rollers along a pair of parallel rails and having a chassis supported by ground engaging wheels; a ballast support member; an equalizer bar having a rail guide roller rotatably mounted adjacent either end thereof; means pivotally mounting said equalizer bar on said ballast support member for oscillating movement about an axis extending generally longitudinally of the vehicle and substantially midway between said rollers; means mounting said ballast support member on said chassis for movement between a lowered operative position with said rollers in engagement with the pair of parallel rails along which the vehicle is to be guided by said rollers and a raised inoperative position with said rollers out of engagement with said rails; and means on said ballast support member for receiving, supporting and retaining a predetermined weight of ballast material sufficient to maintain the rail guide rollers in engagement with said parallel rails for guiding the vehicle therealong when the ballast support member is in the lowered, operative position.

2. A land vehicle according to claim 1 in which said vehicle is steerable and said support ballast member is mounted on the front, steerable end of the chassis, and power means is operably connected with said ballast support member for moving it between said operative and said inoperative positions.

3. A land vehicle according to claim 2 in which said power means comprises a first fluid motor connected with said support member; a fluid pump; first fluid conducting line means connecting said fluid pump and said fluid motor; and first control valve means connected with said first fluid line means for controlling the flow of fluid from said fluid pump to said fluid motor.

4. A land vehicle according to claim 3 in which a second ballast support member is mounted on said chassis at the rear end of the vehicle; a second equalizer bar having guide rollers rotatably mounted adjacent either end thereof is pivotally mounted on said second ballast support member for oscillating movement about an axis extending generally longitudinally of the center line of the vehicle, said second ballast support member being mounted for movement between a lowered operative position with the rollers thereof in engagement with said rails and a raised inoperative position; said ballast support member includes means for receiving, supporting and retaining a predetermined weight of ballast material sufficient to maintain the rail guide rollers in engagement with said parallel rails for guiding the vehicle therealong when the ballast support member is in the lowered, operative position; a second fluid motor is operably connected with said second support member; second fluid line means connect said second fluid motor with said fluid pump; and second control valve is connected with said second fluid line means for controlling the flow of fluid from said fluid pump to said second fluid motor.

5. A land vehicle according to claim 3 having a grader blade; means mounting said grader blade on the vehicle chassis for movement between an extended grading position and a retracted non-grading position; a third fluid motor operably connected with said grader blade for moving it between its extended and retracted positions; fluid conduit means connecting said third fluid motor and said fluid pump; and third valve means connected with said fluid conduit means for controlling the flow of fluid from said fluid pump to said third fluid motor.

6. A land vehicle according to claim 5 in which a second ballast support member is mounted on said chassis at the rear end of the vehicle; a second equalizer bar having guide rollers rotatably mounted adjacent either end thereof is pivotally mounted on said second ballast support member for oscillating movement about an axis extending generally longitudinally of the center line of the vehicle, said second ballast support member being mounted for movement between a lowered operative position with the rollers thereof in engagement with said rails and a raised inoperative position; a second fluid motor is operably connected with said second ballast support member; second fluid line means connect said second fluid motor with said fluid pump; and second control valve means is connected with said second fluid line means for controlling the flow of fluid from said fluid pump to said second fluid motor.

7. A land vehicle according to claim 6 including a diverter valve connected with said first and second fluid line means and with said fluid conduit means for selectively directing the flow of fluid from said pump to either said first and second control valve means or to said third control valve means.

8. A land vehicle according to claim 6 including a diverter valve connected with said first and second fluid line means and with said fluid conduit means for selectively directing the flow of fluid from said pump to either said first and second control valve means or to the said third control valve means, or simultaneously to both said first and second control valves and to said third control valve.

9. A land vehicle according to claim 3 in which said means mounting said ballast support member on said chassis comprises horizontally disposed pivot means; and said fluid motor is connected at one end to a part rigid with the vehicle chassis and at the other end to said ballast support member.

10. A land vehicle according to claim 9 wherein said vehicle is motor driven.

11. A device adapted to be mounted on a land vehicle for guiding the vehicle along a pair of parallel rails, comprising: a mounting bar adapted to be fixedly secured to one end of the land vehicle, said mounting bar having means for attachment with a fluid motor, a ballast support member; means pivotally connecting said ballast support member with said mounting bar for oscillating movement of the member in a vertical plane about a first axis, said ballast support member having means for connection with said fluid motor; an equalizer bar; means pivotally mounting said equalizer bar on said ballast support member for oscillating movement about an axis which extends longitudinally of the device midway between the opposite ends of said equalizer bar and substantially normal to said first axis; a rail guide roller rotatably mounted on said equalizer bar adjacent either end thereof; a fluid motor adapted to be connected with a source of fluid pressure; and means connecting said fluid motor with said attachment means and with said connection means whereby actuation of said fluid motor results in selectively pivoting said ballast support member, equalizer and rail guide rollers between a lowered operating position with said guide rollers in engagement with said rails and a raised non-operating carrying position with said rollers out of engagement with said rails.

12. A device according to claim 11 in which resilient buffer means are positioned between said ballast support member and said equalizer bar for buffering oscillating movement of said equalizer bar in either direction.

13. A device according to claim 12 in which said buffer means comprises a stabilizer spring assembly disposed adjacent each end of said equalizer bar and between said ballast support member and said equalizer bar, and said equalizer bar and said ballast support member each have abutment means rigid therewith positioned to engage opposite ends of said spring assemblies.

14. A device according to claim 13 in which said spring assemblies are carried by said ballast support member and each spring assembly includes a coil compression spring, and means for adjusting the position of the coil spring relative to its respective assembly.

15. A device according to claim 11 in which said equalizer bar is disposed contiguous to and in sliding engagement with the outer end of said ballast support member and said means pivotally mounting said equalizer bar on said ballast support member comprises a pivot pin carried by said ballast support member with its forward end extending outwardly beyond the outer end of the ballast box and into a bearing opening in the equalizer bar.

16. A device according to claim 11 in which the mounting bar attachment means includes a vertical support member extending upwardly from said mounting bar midway between the opposite ends thereof, and said connection means is positioned midway between the opposite sides of said ballast support member, and said fluid motor is disposed between the upper end of said support member and said connection means, and means is provided for pivotally connecting one end of the fluid motor with the upper end of said support member and for pivotally connecting the other end of the fluid motor with said connection means.

17. A device according to claim 11 including fastening means for supporting and holding said ballast support member, equalizer bar and rail guide rollers in said raised carrying position.

18. A device according to claim 11 in which said rollers and said equalizer bar are formed of metal capable of conducting an electric current, and electrical insulating means is positioned between at least one of said rollers and said equalizer bar thereby preventing the passage of an electric current from one roller to the other.

19. A device according to claim 18 in which each of said rollers is carried by a mount fixed to said equalizer bar, and said electrical insulating means comprises electric insulation positioned between each of said rollers and the corresponding mount.

20. A device according to claim 19 in which each of said rollers is rotatably mounted on a shaft and at least a portion of said electrical insulation means is positioned between each shaft and its respective roller.

21. A device according to claim 20 in which the axis of one of said shafts is disposed substantially normal to the axis of the other of said shafts, and the axes of said shafts are disposed at an angle of substantially 45° to a horizontal plane coextensive with the axis of the equalizer bar pivotal mounting means.

22. A device according to claim 11 in which each of said rollers has a V-shaped groove in the periphery thereof with an included angle of substantially 90°, the walls of each of said grooves are disposed at an angle of substantially 45° with respect to the axis of rotation of the corresponding roller, said guide rollers are mounted on the equalizer bar at an angle of substantially 45° to the horizontal, each of said rollers is adapted to engage its respective rail on the inner surface thereof and on the adjacent top surface thereof, and the wall of each roller engageable with the top surface of the rails is of greater width than the wall engageable with the inner surface of the rails.

23. A device adapted to be mounted on a land vehicle for guiding the vehicle along a pair of parallel rails, comprising: a mounting bar adapted to be fixedly secured to one end of the land vehicle, a ballast support member; means connecting said ballast support member with said mounting bar for movement of the member in a vertical direction; an equalizer bar; means pivotally mounting said equalizer bar on said ballast support member for oscillating movement about an axis which extends longitudinally of the device midway between the opposite ends of said equalizer bar; a rail guide roller rotatably mounted on said equalizer bar adjacent either end thereof; means on said ballast support member for receiving, supporting and retaining a predetermined weight of ballast material sufficient to maintain the rail guide rollers in engagement with said parallel rails for guiding the vehicle therealong when the ballast support member is in the lowered, operative position; and power means connected with said mounting bar and with said ballast support member for selectively moving said ballast support member, equalizer and rail guide rollers vertically between a lowered operating position with said guide rollers in engagement with said rails and a raised non-operating carrying position with said rollers out of engagement with said rails.

24. A device according to claim 23 in which said power means comprises a hydraulic cylinder.

25. A device according to claim 11 including means on said ballast support member for receiving, supporting and retaining a predetermined weight of ballast material sufficient to maintain the rail guide rollers in engagement with said parallel rails for guiding the vehicle therealong when the ballast support member is in the lowered, operative positioned.

* * * * *